(12) United States Patent
Yajima et al.

(10) Patent No.: US 10,639,980 B2
(45) Date of Patent: May 5, 2020

(54) WINDOW GLASS WITH SEAL MEMBER

(71) Applicant: AGC Inc., Tokyo (JP)

(72) Inventors: Toshimi Yajima, Tokyo (JP); Kiyoshi Nobuoka, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/446,054

(22) Filed: Jun. 19, 2019

(65) Prior Publication Data
US 2019/0299765 A1    Oct. 3, 2019

Related U.S. Application Data

(63) Continuation of application No. PCT/JP2017/045814, filed on Dec. 20, 2017.

(30) Foreign Application Priority Data

Dec. 26, 2016  (JP) ................................ 2016-250706

(51) Int. Cl.
*B60J 10/70*    (2016.01)
*B60J 1/02*    (2006.01)
(Continued)

(52) U.S. Cl.
CPC ................. *B60J 10/70* (2016.02); *B60J 1/00* (2013.01); *B60J 1/02* (2013.01); *B60J 1/08* (2013.01);
(Continued)

(58) Field of Classification Search
CPC ......... B60J 1/00; B60J 1/02; B60J 1/08; B60J 1/18; B60J 10/15; B60J 10/34; B60J 10/70
See application file for complete search history.

(56) References Cited

U.S. PATENT DOCUMENTS

| 5,083,835 A | * | 1/1992 | Rossini | .................... | B60J 10/24 |
| | | | | | 296/201 |
| 5,248,179 A | * | 9/1993 | Biermacher | ............. | B60J 10/70 |
| | | | | | 296/146.15 |

(Continued)

FOREIGN PATENT DOCUMENTS

| JP | 2007-197288 A | 8/2007 |
| JP | 2007-314370 A | 12/2007 |

(Continued)

OTHER PUBLICATIONS

International Searching Authority, "International Search Report," issued in connection with International Patent Application No. PCT/JP2017/045814, dated Feb. 6, 2018.

(Continued)

*Primary Examiner* — James M Ference
(74) *Attorney, Agent, or Firm* — Foley & Lardner LLP

(57) ABSTRACT

A window glass with a seal member mounted to an opening of a vehicle includes a laminated glass including a vehicle outside glass plate, a vehicle inside glass plate, and an intermediate film; and a seal member arranged in a peripheral portion of the laminated glass. A plate thickness of the vehicle inside glass plate is less than that of the vehicle outside glass plate, and 1.0 mm or less. The vehicle outside glass plate has a shielding layer in a peripheral portion of a vehicle inside surface. In a cross section of the laminated glass perpendicular to an outer peripheral edge, an end of the vehicle inside glass plate is located inward in an in-plane direction with respect to an end of the vehicle outside glass plate. The seal member has a first fixing part that is bonded to the vehicle outside glass plate via the shielding layer.

16 Claims, 4 Drawing Sheets

(51) Int. Cl.
  *B60J 1/08*  (2006.01)
  *B60J 1/18*  (2006.01)
  *B60J 1/00*  (2006.01)
  *B60J 10/15*  (2016.01)
  *B60J 10/34*  (2016.01)

(52) U.S. Cl.
  CPC ............... *B60J 1/18* (2013.01); *B60J 10/15* (2016.02); *B60J 10/34* (2016.02)

(56) References Cited

U.S. PATENT DOCUMENTS

| | | | | |
|---|---|---|---|---|
| 5,311,711 A * | 5/1994 | Desir, Sr. | ................ | B29C 48/12 52/208 |
| 5,384,995 A * | 1/1995 | Kunert | ................ | B29C 43/206 52/394 |
| 5,492,387 A * | 2/1996 | Yada | ................ | B29D 99/0053 296/93 |
| 5,603,546 A * | 2/1997 | Desir, Sr. | ................ | B60J 10/45 296/146.15 |
| 5,935,356 A * | 8/1999 | Soldner | ................ | C03C 27/048 156/108 |
| 6,043,782 A * | 3/2000 | Dishart | ............. | B32B 17/10036 343/713 |
| 6,769,700 B2 * | 8/2004 | Ortmuller | ................ | B60J 10/18 277/642 |
| 8,393,668 B2 * | 3/2013 | Timmermann | .......... | B60J 10/35 296/84.1 |
| 8,444,205 B2 * | 5/2013 | Flammer | ................ | B60J 10/265 296/201 |
| 8,449,016 B2 * | 5/2013 | Timmermann | .......... | B60J 10/30 296/146.15 |
| 8,829,539 B2 * | 9/2014 | Kleo | ................ | B32B 17/10293 257/82 |
| 9,168,879 B2 * | 10/2015 | Timmermann | ............ | B60J 1/02 |
| 9,259,994 B2 * | 2/2016 | Erner | ........................ | B60J 1/02 |
| 2004/0035066 A1 * | 2/2004 | Leconte | ................ | B60J 10/70 52/204.591 |
| 2005/0191498 A1 * | 9/2005 | Kasahara | ................ | B60J 10/34 428/415 |
| 2006/0168903 A1 * | 8/2006 | Kiriakou | ................ | B60J 10/70 52/204.591 |
| 2012/0256447 A1 * | 10/2012 | Majer | ...................... | B60J 10/70 296/201 |
| 2013/0295357 A1 * | 11/2013 | Cleary | ............. | B32B 17/10036 428/215 |
| 2013/0300146 A1 * | 11/2013 | Ogawa | ....................... | B60J 1/02 296/84.1 |
| 2013/0301118 A1 * | 11/2013 | Ogawa | ....................... | B60J 1/02 359/350 |
| 2014/0204601 A1 * | 7/2014 | Bauerle | ................. | B60Q 1/268 362/511 |
| 2014/0327267 A1 * | 11/2014 | Deussen | ................... | B60J 10/18 296/93 |
| 2014/0332519 A1 * | 11/2014 | Sakamoto | ................... | B60J 1/02 219/203 |
| 2014/0374401 A1 * | 12/2014 | Nakagawa | ......... | B32B 17/10302 219/203 |
| 2015/0151791 A1 * | 6/2015 | Sano | ...................... | B62D 25/081 296/192 |
| 2016/0250913 A1 * | 9/2016 | Li | ............................ | B60J 10/24 10/24 |
| 2016/0326049 A1 * | 11/2016 | Kamitani | .................... | B60J 1/00 |
| 2019/0299765 A1 * | 10/2019 | Yajima | ..................... | B60J 10/70 |

FOREIGN PATENT DOCUMENTS

| | | |
|---|---|---|
| JP | 2010-070414 A | 4/2010 |
| JP | 2016-530190 A | 9/2016 |

OTHER PUBLICATIONS

International Searching Authority, "Written Opinion," issued in connection with International Patent Application No. PCT/JP2017/045814, dated Feb. 6, 2018.

* cited by examiner

WINDOW GLASS WITH SEAL MEMBER

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/045814 filed on Dec. 20, 2017 and designating the U.S., which claims priority of Japanese Patent Application No. 2016-250706 filed on Dec. 26, 2016. The entire contents of the foregoing applications are incorporated herein by reference.

BACKGROUND OF THE INVENTION

1. Field of the Invention

The present invention relates to a window glass with a seal member.

2. Description of the Related Art

Conventionally, a laminated glass, in which a first glass plate and a second glass plate are bonded to each other via an intermediate film, has been used for a vehicle window glass. For example, Japanese Unexamined Patent Application Publication No. 2007-197288 discloses a laminated glass including two glass plates having different plate thicknesses.

SUMMARY OF THE INVENTION

Problem to be Solved by the Invention

Recently, a laminated glass having different thicknesses including a thick glass plate (first glass plate) and a thin glass plate (second glass plate) has been required for a vehicle window glass, from a viewpoint of reducing a weight of a vehicle while maintaining a rigidity of a window.

However, in the laminated glass disclosed in Japanese Unexamined Patent Application Publication No. 2007-197288, a rigidity of the second glass plate is low. Thus, in the case where the laminated glass disclosed in Japanese Unexamined Patent Application Publication No. 2007-197288 is mounted to a vehicle via a seal member arranged on a vehicle inside surface of the second glass, when an external force due to a vibration of the vehicle or the like, is applied to the second glass plate through the seal member, the second glass plate may be easily broken due to a stress from the external force.

The present invention has been made in view of the above-described problem, and aims at providing a window glass with a seal member, in which a vehicle inside glass plate is not broken even when an external force due to a vibration of the vehicle or the like is applied.

Means for Solving Problems

In order to solve the problem, according to an aspect of the present invention, a window glass with a seal member mounted to an opening of a vehicle includes a laminated glass including a vehicle outside glass plate, a vehicle inside glass plate, and an intermediate film interposed between the vehicle outside glass plate and the vehicle inside glass plate; and a seal member arranged in at least a part of a peripheral portion of the laminated glass. A plate thickness of the vehicle inside glass plate is less than a plate thickness of the vehicle outside glass plate, and 1.0 mm or less. The vehicle outside glass plate has a shielding layer in a peripheral portion of a vehicle inside surface of the vehicle outside glass plate. In a cross section of the laminated glass perpendicular to an outer peripheral edge of the laminated glass, within at least a part of the outer peripheral edge of the laminated glass, an end of the vehicle inside glass plate is located inward in an in-plane direction with respect to an end of the vehicle outside glass plate. The seal member has a first fixing part that is bonded to the vehicle outside glass plate via the shielding layer.

Effect of Invention

According to the present invention, a window glass with a seal member, in which a vehicle inside glass plate is not broken even when an external force due to a vibration of a vehicle or the like is applied, is provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, with reference to drawings, embodiments of the present invention will be illustratively described in detail. Note that the components described in the embodiment shown below are merely examples, and are not intended to limit the scope of the present invention to the embodiment.

First Embodiment

Figure 1:
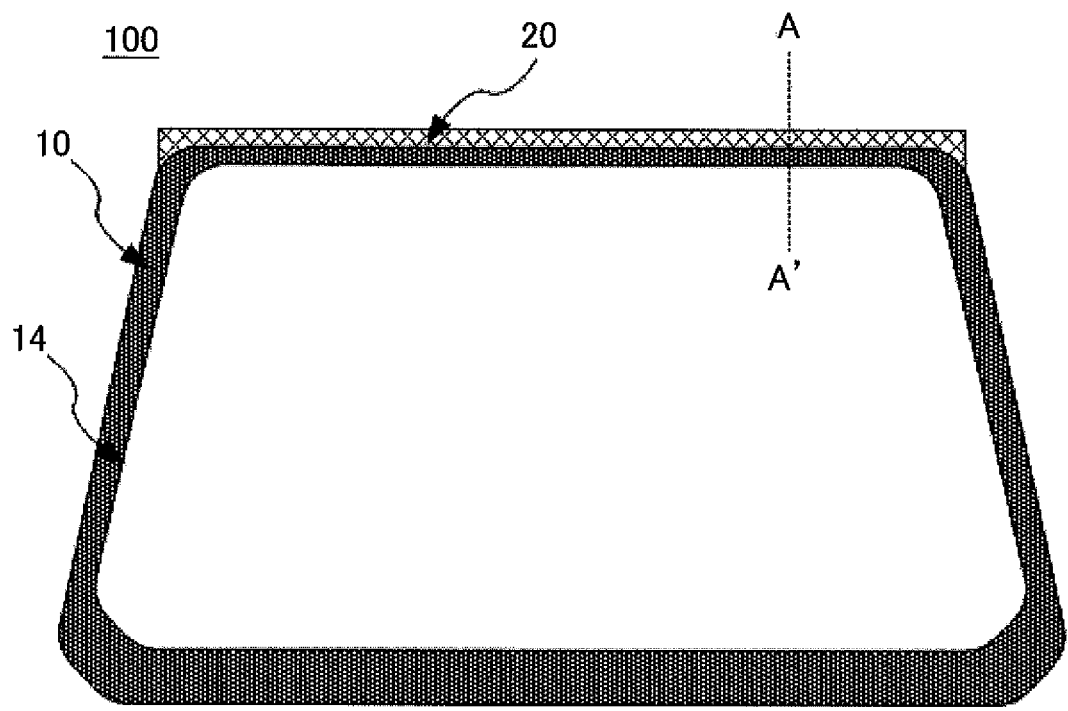
FIG. 1 is a front view depicting an example of a window glass with a seal member according to a first embodiment of the present invention.

FIG. 1 is a front view depicting an example of a window glass with a seal member 100 according to a first embodiment of the present invention.

Figure 2:
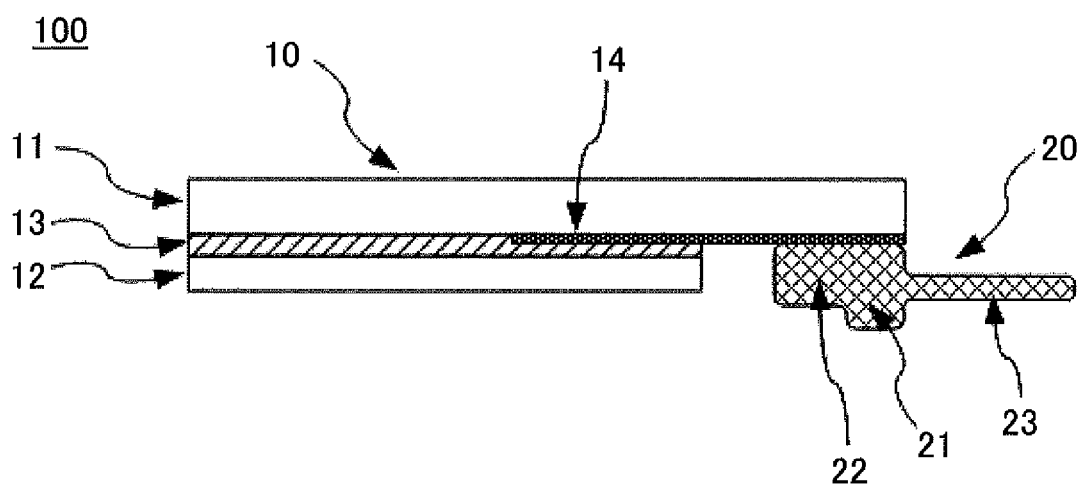
FIG. 2 is a cross sectional view of the window glass with a seal member, cut along an A-A' line in FIG. 1.

FIG. 2 is a cross-sectional view obtained by cutting the window glass with a seal member 100 according to the first embodiment, illustrated in FIG. 1, in a direction perpendicular to an outer peripheral edge of the window glass (along an A-A' line in FIG. 1). As shown in FIG. 2, the window glass with a seal member 100 according to the first embodiment includes a laminated glass 10 having a vehicle outside glass plate 11, a vehicle inside glass plate 12, and an intermediate film 13 interposed between the vehicle outside glass plate 11 and the vehicle inside glass plate 12; and a seal member 20 arranged in at least a part of a peripheral portion of the laminated glass 10.

The window glass with a seal member 100 according to the first embodiment is mounted to an opening of a vehicle, and used as a windshield, a rear glass, a side glass, or a roof glass, for example.

For the intermediate film 13, a film made of a polyvinyl butyral (PVB) is used. When water resistance is required, ethylene vinyl acetate copolymer (EVA) is preferably used. Furthermore, acrylic photopolymerization type prepolymers, acrylic catalyzed polymerization type prepolymers, acrylic ester-vinyl acetate photopolymerization type prepolymers, polyvinyl chloride, or the like may be used.

A plate thickness of the vehicle inside glass plate 12 is less than a plate thickness of the vehicle outside glass plate 11. The plate thickness of the vehicle inside glass plate 12 is preferably 0.2 mm or more and 1.0 mm or less, more preferably 0.3 mm or more and 0.8 mm or less, and further preferably 0.4 mm or more and 0.7 mm or less. A weight of the laminated glass 10 is reduced when the plate thickness of the vehicle inside glass plate 12 is 1.0 mm or less. Moreover, when the plate thickness of the vehicle inside glass plate 12 is 0.2 mm or more, a flexural rigidity required for the laminated glass is satisfied. Thus, an operator easily handles the vehicle inside glass plate 12 during conveyance of the vehicle inside glass plate 12.

Note that the vehicle inside glass plate 12 may be a chemically tempered glass. According to the strengthening of the vehicle inside glass plate 12, a compressive stress layer is properly formed, and a strength required for the laminated glass 10 is satisfied.

A plate thickness of the vehicle outside glass plate 11 is preferably 1.5 mm or more and 2.2 mm or less, and more preferably 1.7 mm or more and 2.0 mm or less. A weight of the laminated glass 10 is reduced when the plate thickness of the vehicle outside glass plate 11 is 2.2 mm or less. Moreover, when the plate thickness of the vehicle outside glass plate 11 is 1.5 mm or more, a flexural rigidity required for the laminated glass 10 is satisfied.

In a peripheral portion of a vehicle inside surface of the vehicle outside glass plate 11, a shielding layer 14 which is dark, such as black, and opaque (dark ceramic layer) is formed in a belt-like shape over the entire periphery of the surface. The shielding layer 14 has a function of protecting a urethane seal member or the like, which bonds the laminated glass 10 to a vehicle body and holds the laminated glass 10 on the vehicle body, from deterioration due to ultraviolet light. In the embodiment, the shielding layer 14 is formed by performing a screen printing, applying a ceramic color paste (black ceramic) formed of a meltable glass frit containing black pigments to the peripheral portion of the vehicle inside surface of the vehicle outside glass plate 11; baking the ceramic color paste onto the glass plate by heating; and strengthening the paste by slow cooling or rapid cooling. The shielding layer 14 may be formed by using other known methods. In addition, the shielding layer 14 may be arranged on a peripheral portion of a vehicle outside surface of the vehicle inside glass plate 12 and/or a peripheral portion of a vehicle inside surface of the vehicle inside glass plate 12.

As shown in FIG. 2, in a cross-section obtained by cutting (along an A-A' line of FIG. 1) perpendicular to an outer peripheral edge of the laminated glass 10, within at least a part of the outer peripheral edge of the laminated glass 10, an end of the vehicle inside glass plate 12 is located inward in an in-plane direction with respect to an end of the vehicle outside glass plate 11. Such a structure is obtained by laminating the vehicle outside glass plate 11 and the vehicle inside glass plate 12 having a main surface area smaller than a main surface area of the vehicle outside glass plate 11.

The laminated glass 10 includes a seal member 20 at least in a part of the peripheral portion of the vehicle outside glass plate 11. The seal member 20 is an elongated member that extends in a vehicle width direction in the laminated glass 10. FIG. 1 illustrates the seal member 20 disposed on an upper edge of the laminated glass 10. However, the present invention is not limited to this. The seal member 20 may be disposed on a side edge or a lower edge of the laminated glass 10.

In FIG. 2, the seal member 20 includes a main body part 21 formed so as to project toward the vehicle inside of the laminated glass 10; a first fixing part 22 bonded to the vehicle outside glass plate 11 on the shielding layer 14; and a lip part 23 formed so as to project from the first fixing part 22 in a direction opposite to the vehicle inside glass plate 12.

A primer (not shown) is applied to bonding surfaces of the shielding layer 14 and the first fixing part 22, and the shielding layer 14 and the first fixing part 22 are bonded to each other via a bonding layer (not shown). The bonding layer may be a double-sided tape or an adhesive agent. When the bonding layer is a double-sided tape, a known double-sided tape may be used. When the bonding layer is an adhesive agent, the adhesive agent is not particularly limited, and an acrylic resin-based adhesive agent, a urethane resin-based adhesive agent, an epoxy resin-based adhesive agent, or the like may be used.

Figure 3:
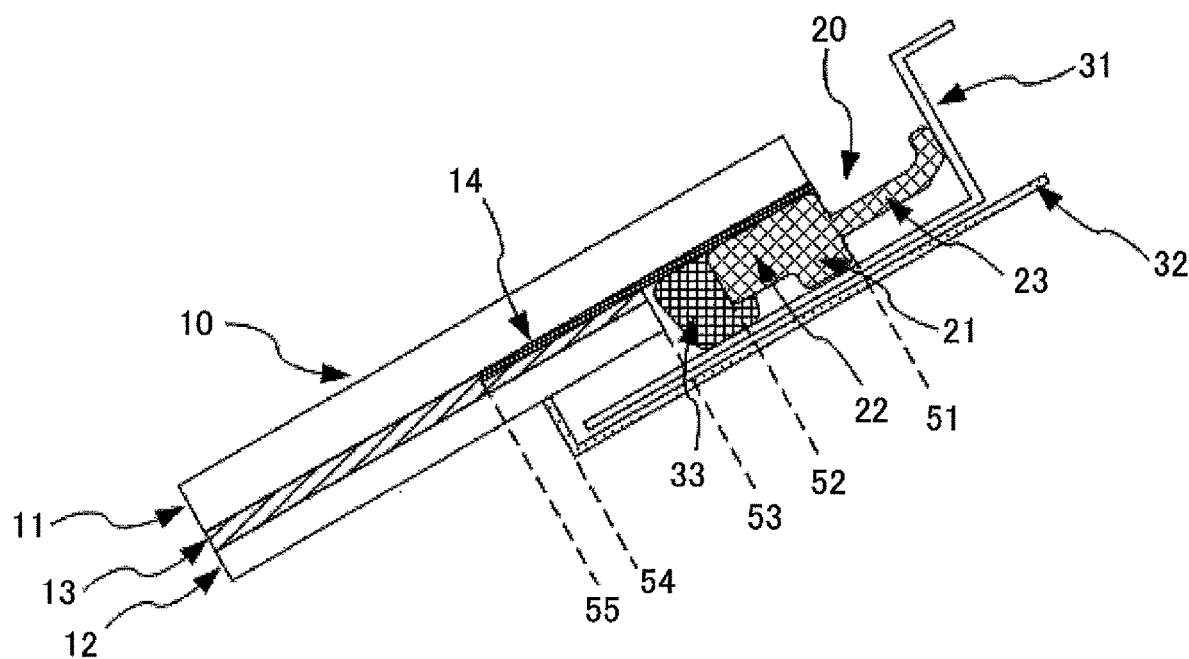
FIG. 3 is a cross-sectional view of a main part of an upper edge portion of the window glass with a seal member according to the first embodiment of the present invention, when the window glass is mounted to a vehicle body.

FIG. 3 is a cross sectional view of a main part of the upper edge portion of the window glass with a seal member 100 according to the first embodiment, when the window glass with a seal member 100 is mounted to a vehicle body. As shown in FIG. 3, on the shielding layer 14 of the vehicle outside glass plate 11, the laminated glass 10 is bonded to a part of a body flange 31 of the vehicle that faces the vehicle inside surface of the laminated glass 10, via a bonding member 33 arranged between the end of the vehicle inside glass plate 12 and the seal member 20; and the lip part 23 contacts the body flange 31. Thus, the window glass with a seal member 100 according to the first embodiment is mounted to the vehicle body.

A material of the bonding member 33 is not particularly limited, and an acrylic resin-based adhesive agent, a urethane resin-based adhesive agent, an epoxy resin-based adhesive agent, or the like may be used. When the bonding member 33 is provided between the shielding layer 14 of the vehicle outside glass plate 11 and the body flange 31, moisture is prevented from entering from the outside of the vehicle, and it is preferable. Note that in FIG. 3, the bonding member 33 is provided so as to contact the seal member 20. However, the bonding member 33 may not contact the seal member 20. The bonding member 33 may contact the vehicle inside glass plate 12.

The lip part 23 is made of an elastic material, and contacts a surface of the body flange 31 that faces the end of the laminated glass 10 (opposite surface), and is preloaded between the main body part 21 and the opposite surface of the body flange 31.

The main body part 21 is preferably separated by a small distance from the body flange 31. In the case where the main body part 21 is separated by a small distance from the body flange 31, even when the window glass with a seal member 100 vibrates due to a vibration of the vehicle or the like, a contact noise does not occur because the main body part 21 does not contact the body flange 31, and it is preferable. Moreover, when an external force is applied to the window glass with a seal member 100 so as to push the window glass toward the vehicle inside, a distance of motion of the window glass with a seal member 100 toward the vehicle inside is less than or equal to the separation distance between the main body part 21 and the body flange 31, and it is preferable.

In order to enhance the design viewed from the vehicle inside, an interior member 32 is arranged so as to cover the body flange 31. An inner end 54 of the interior member 32 in the in-plane direction contacts a vehicle inside surface of the vehicle inside glass plate 12.

According to the first embodiment, when the window glass with a seal member 100 is mounted to the vehicle body, in the cross-section shown in FIG. 3, an end 51 of the vehicle outside glass plate 11, an inner end 52 of the first fixing part 22 in the in-plane direction, an end 53 of the vehicle inside glass plate 12, the inner end 54 of the interior member 32 in the in-plane direction, and an inner end 55 of the shielding layer 14 in the in-plane direction are disposed in this order, inward in the in-plane direction with respect to the outer peripheral edge of the laminated glass 10.

The seal member 20 is arranged so that the inner end 52 of the first fixing part 22 is located between the end 51 of the vehicle outside glass plate 11 and the end 53 of the vehicle inside glass plate 12. Thus, the seal member 20 is provided on the shielding layer 14 formed in the peripheral portion of the vehicle inside surface of the vehicle outside glass plate 11.

Moreover, the interior member 32 is arranged so that the end 53 of the vehicle inside glass plate 12 is located between the end 51 of the vehicle outside glass plate 11 and the inner end 54 of the interior member 32. Thus, the end 53 of the vehicle inside glass plate 12 is not exposed to the vehicle inside, and it is preferable in appearance.

Furthermore, the interior member 32 is arranged so that the inner end 54 of the interior member 32 is located between the end 51 of the vehicle outside glass plate 11 and the inner end 55 of the shielding layer 14. Thus, a part where the interior member 32 contacts the vehicle inside glass plate 12 is not viewed from the vehicle outside, and it is preferable in appearance.

In the laminated glass 10 according to the first embodiment, because the plate thickness of the vehicle inside glass plate 12 is 1.0 mm or less, the rigidity of the vehicle inside glass plate 12 is low. If the seal member 20 were to be arranged on the vehicle inside surface of the vehicle inside glass plate 12 having a low rigidity with the laminated glass 10 being mounted to the vehicle body, the vehicle inside glass plate 12 would be deformed due to a stress from an external force due to a vibration of the vehicle or the like applied to the vehicle inside glass plate 12. If the vehicle inside glass plate 12 were to deform due to such stress, a tensile force caused by the deformation would be added to the external force; thus, the vehicle inside glass plate 12 becoming easily damaged would be of concern. Moreover, due to such deformation of the vehicle inside glass plate 12, a force to peel the intermediate film 13 from the laminated glass 10 were to be applied to the laminated glass 10, and bubbles would be generated in the peripheral portion of the laminated glass 10.

However, in the case where the seal member 20 is arranged on the shielding layer 14 formed in the peripheral portion of the vehicle inside surface of the vehicle outside glass plate 11, which is thick and has a high rigidity, even if the external force due to the vibration of the vehicle or the like is applied to the vehicle outside glass plate 11, the vehicle outside glass plate 11 is not damaged according to the high rigidity. Furthermore, because a stress from the external force is not applied to the vehicle inside glass plate 12 having the low rigidity, the vehicle inside glass plate 12 is not damaged. Moreover, the vehicle inside glass plate 12 is not deformed by the stress from the external force, and bubbles are not generated in the peripheral portion of the laminated glass 10.

In the window glass with a seal member 100 according to the first embodiment, the vehicle inside glass plate 12 is not damaged, even if an external force due to a vibration of the vehicle or the like is applied.

Second Embodiment

Figure 4:
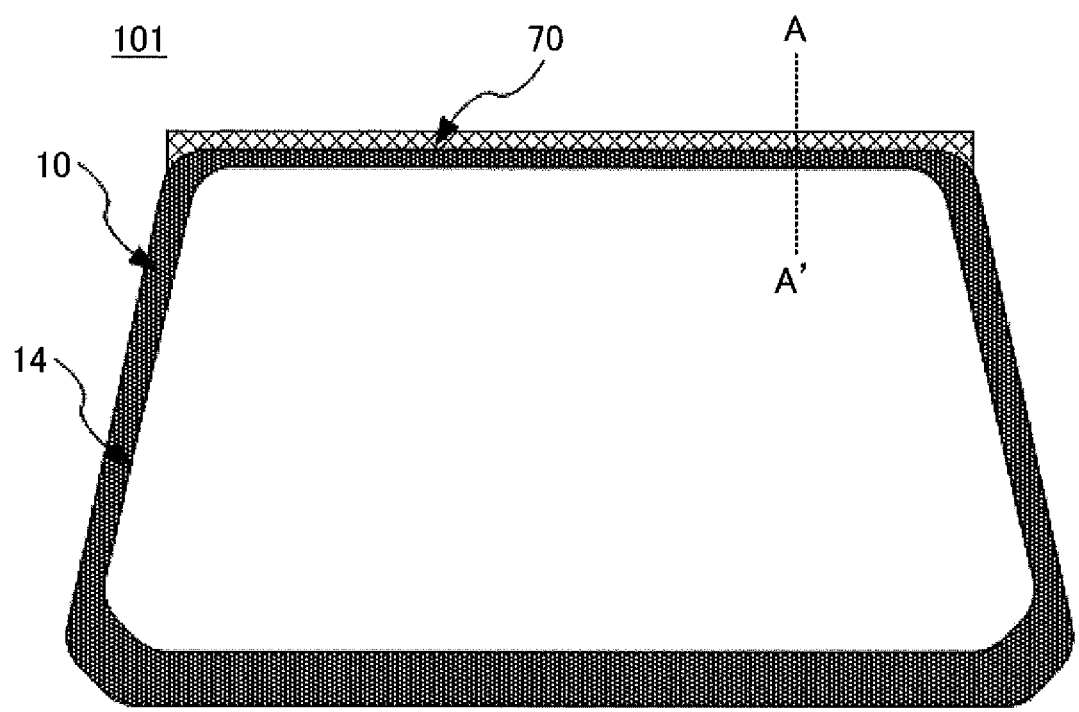
FIG. 4 is a front view depicting an example of a window glass with a seal member according to a second embodiment of the present invention.

FIG. 4 is a front view depicting an example of a window glass with a seal member 101 according to a second embodiment of the present invention.

Figure 5:
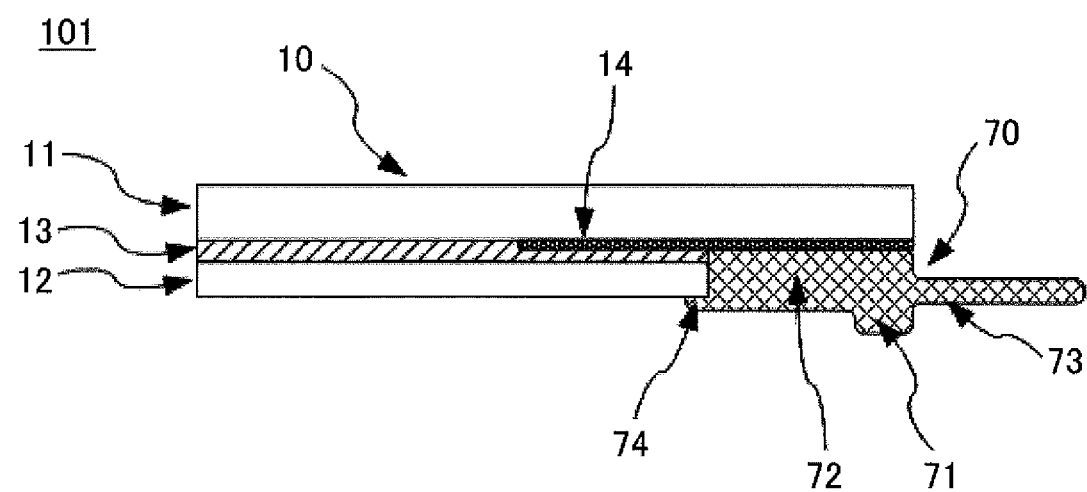
FIG. 5 is a cross-sectional view of the window glass with a seal member, cut along an A-A' line in FIG. 4.

FIG. 5 is a cross-sectional view depicting the window glass with a seal member 101 according to the second embodiment, shown in FIG. 4, in a direction perpendicular to the outer peripheral edge of the window glass (along an A-A' line in FIG. 4). As shown in FIG. 5, the window glass with a seal member 101 according to the second embodiment includes a laminated glass 10 having a vehicle outside glass plate 11, a vehicle inside glass plate 12, and an intermediate film 13 interposed between the vehicle outside glass plate 11 and the vehicle inside glass plate 12; and a seal member 70 arranged in at least a part of the peripheral portion of the laminated glass 10.

In FIG. 5, the seal member 70 includes a main body part 71 formed so as to project on the vehicle inside of the laminated glass 10; a first fixing part 72 bonded to the vehicle outside glass plate 11 on the shielding layer 14; and a lip part 73 formed so as to project from the first fixing part 72 in a direction opposite to the vehicle inside glass plate 12. The window glass with a seal member 101 according to the second embodiment, different from the window glass with a seal member 100 according to the first embodiment, has a second fixing part 74 that is bonded to the peripheral portion on the vehicle inside surface of the vehicle inside glass plate 12. Other elements are the same as those in the window glass with a seal member 100 according to the first embodiment, the same reference numeral is assigned to the corresponding element, and an explanation thereof will be omitted.

A primer (not shown) is applied to bonding surfaces of the shielding layer 14 and the first fixing part 72, and the shielding layer 14 and the first fixing part 72 are bonded to each other via a bonding layer (not shown). The bonding layer may be a double-sided tape or an adhesive agent. When the bonding layer is a double-sided tape, a known double-sided tape may be used. When the bonding layer is an adhesive agent, the adhesive agent is not particularly limited, and an acrylic resin-based adhesive agent, a urethane resin-based adhesive agent, an epoxy resin-based adhesive agent, or the like may be used.

The second fixing part 74 is bonded to the peripheral portion of the vehicle inside surface of the vehicle inside glass plate 12. A primer (not shown) is applied to bonding surfaces of the vehicle inside glass plate 12 and the second fixing part 74, and the vehicle inside glass plate 12 and the second fixing part 74 are bonded to each other via a bonding layer (not shown). The bonding layer may be a double-sided tape or an adhesive agent. When the bonding layer is a double-sided tape, a known double-sided tape may be used.

When the bonding layer is an adhesive agent, the adhesive agent is not particularly limited, and an acrylic resin-based adhesive agent, a urethane resin-based adhesive agent, an epoxy resin-based adhesive agent, or the like may be used.

Figure 6:
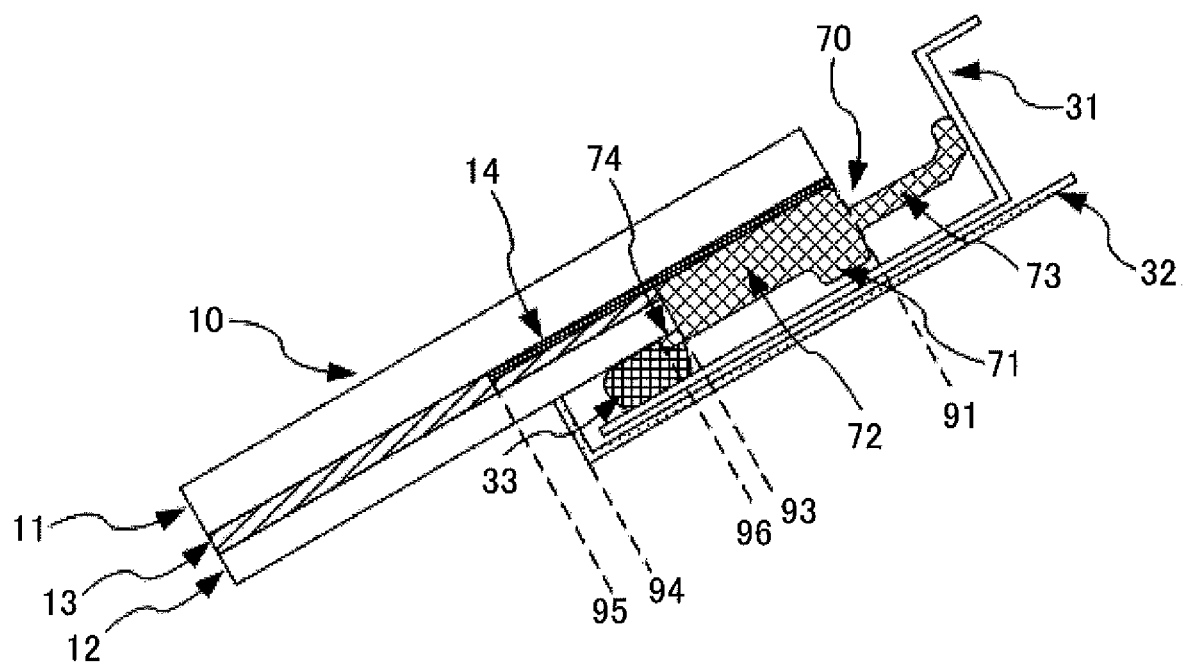
FIG. 6 is a cross-sectional view of a main part of an upper edge portion of the window glass with a seal member according to the second embodiment of the present invention, when the window glass is mounted to a vehicle body.

FIG. 6 is a cross-sectional view of a main part of the upper edge portion of the window glass with a seal member according to the second embodiment, when the window glass with a seal member 101 is mounted to a vehicle body. As shown in FIG. 6, the laminated glass 10 is bonded to a part of a body flange 31 of the vehicle that faces the vehicle inside surface of the laminated glass 10, via a bonding member 33 arranged on the vehicle inside surface of the vehicle inside glass plate 12; and the lip part 73 contacts the body flange 31. Thus, the window glass with a seal member 101 according to the second embodiment is mounted to the vehicle body.

According to the bonding member 33 arranged between the vehicle inside surface of the vehicle inside glass plate 12 and the body flange 31, as shown in FIG. 6, moisture is prevented from entering from the vehicle outside, and it is preferable. In FIG. 6, the bonding member 33 contacts the seal member 70. However, the present invention is not limited to this, and the bonding member 33 may not contact the seal member 70.

The lip part 73 is made of an elastic material that contacts a surface of the body flange 31 that faces the end of the laminated glass 10 (opposite surface) and is preloaded between the main body part 71 and the opposite surface of the body flange 31.

The main body part 71 is preferably separated by a small distance from the body flange 31. In the case where the main body part 71 is separated by a small distance from the body flange 31, even when the window glass with a seal member 101 vibrates due to a vibration of the vehicle or the like, a contact noise does not occur because the main body part 71 does not contact the body flange 31, and it is preferable. In addition, when an external force is applied to the window glass with a seal member 101 so as to push the window glass toward the vehicle inside, a distance of motion of the window glass with a seal member 101 toward the vehicle inside is less than or equal to the separation distance between the main body part 71 and the body flange 31, and it is preferable.

To enhance the design viewed from the vehicle inside, the interior member 32 is arranged so as to cover the body flange 31. An inner end 94 of the interior member 32 in the in-plane direction contacts the vehicle inside surface of the vehicle inside glass plate 12.

According to the second embodiment, when the window glass with a seal member 101 is mounted to the vehicle body, in the cross-section shown in FIG. 6, an end 91 of the vehicle outside glass plate 11, an end 93 of the vehicle inside glass plate 12, an inner end 96 of the second fixing part 74, an inner end 94 of the interior member 32 in the in-plane direction, and an inner end 95 of the shielding layer 14 are disposed in this order, inward in the in-plane direction with respect to the outer peripheral edge of the laminated glass 10.

The seal member 70 is arranged so that the inner end 96 of the second fixing part 74 is located inward in the in-plane direction with respect to the end 93 of the vehicle inside glass plate 12. Thus, ends of the vehicle inside glass plate 12 and the intermediate film 13 are not exposed, and it is preferable.

Moreover, the interior member 32 is arranged so that the inner end 96 of the second fixing part 74 is located between the end 91 of the vehicle outside glass plate 11 and the inner end 94 of the interior member 32. Thus, the inner end 96 of the second fixing part 74 is not exposed to the vehicle inside, and it is preferable in appearance.

Furthermore, the interior member 32 is arranged so that the inner end 94 of the interior member 32 is located between the end 91 of the vehicle outside glass plate 11 and the inner end 95 of the shield layer 14. Thus, a part where the interior member 32 contacts the vehicle inside glass plate 12 is not viewed from the vehicle outside, and it is preferable in appearance.

In the second embodiment, an area of the region where the second fixing part 74 is bonded to the vehicle inside glass plate 12 is preferably smaller than an area of the region where the first fixing part 72 is bonded to the vehicle outside glass plate 11 on the shielding layer 14. In the case where the area of the region where the second fixing part 74 is bonded to the vehicle inside glass plate 12 is smaller than the area of the region where the first fixing part 72 is bonded to the vehicle outside glass plate 11 on the shielding layer 14, the external force due to the vibration of the vehicle or the like is mainly applied to the vehicle outside glass plate 11, and the external force is not appreciably applied to the vehicle inside glass plate 12.

The second fixing part 74 may be arranged so as to cover, from an inner end 96 of the first fixing part 72, the end 93 of the vehicle inside glass plate 12. When the second fixing part 74 is arranged to cover the end 93 of the vehicle inside glass plate 12 from the inner end 96 of the first fixing part 72, the end of the vehicle inside glass plate 12 and the end of the intermediate film 13 are not exposed to the vehicle outside. Thus, even when moisture enters from the outside between the laminated glass 10 and the body flange 31, the moisture does not contact the end of the intermediate film 13, the vehicle inside glass plate 12 of the vehicle is not damaged, and it is preferable.

In the window glass with a seal member 101 according to the second embodiment, the vehicle inside glass plate 12 is not damaged, even if an external force due to a vibration of the vehicle or the like is applied.

As described above, with reference to the embodiments the present invention has been described. The present invention is not limited to the embodiments. Various variations and modifications that a person skilled in the art will comprehend may be made for the configurations and details of the present invention without deviating from the scope of the present invention.

INDUSTRIAL APPLICABILITY

The window glass with a seal member according to the present invention is preferably applied to an opening of a vehicle. However, the window glass with a seal member according to the present invention may be applied to any vehicle, such as a train and a locomotive, travelling on a railway, in addition to a passenger vehicle and a transport vehicle, traveling on a road. Furthermore, the window glass with a seal member according to the present invention is not limited to a vehicle, and may be applied also to means of transportation, such as an aircraft and a ship.

REFERENCE SIGNS LIST 100, 101 window glass with a seal member
10 laminated glass
11 vehicle outside glass plate
12 vehicle inside glass plate
13 intermediate film 14 shielding layer
20 seal member
21, 71 main body part
22, 72 first fixing part
23, 73 lip part
74 second fixing part
31 body flange
32 interior member
33 bonding member
51, 91 end of the vehicle outside glass plate
52 inner end of the first fixing part
53, 93 end of the vehicle inside glass plate
54, 94 inner end of the interior member
55, 95 end of the shielding layer
96 inner end of the second fixing part

What is claimed is:

1. A window glass with a seal member mounted to an opening of a vehicle, the window glass with a seal member comprising:
   a laminated glass including a vehicle outside glass plate, a vehicle inside glass plate, and an intermediate film interposed between the vehicle outside glass plate and the vehicle inside glass plate; and
   a seal member arranged in at least a part of a peripheral portion of the laminated glass,
   wherein a plate thickness of the vehicle inside glass plate is less than a plate thickness of the vehicle outside glass plate,
   wherein the vehicle outside glass plate has a shielding layer in a peripheral portion of a vehicle inside surface of the vehicle outside glass plate,
   wherein in a cross section of the laminated glass perpendicular to an outer peripheral edge of the laminated glass, within at least a part of the outer peripheral edge of the laminated glass, an end of the vehicle inside glass plate is located inward in an in-plane direction from an end of the vehicle outside glass plate,
   wherein the seal member is an elongated member that extends in a vehicle width direction in the laminated glass,
   wherein the seal member is disposed on an upper edge of the laminated glass, and
   wherein the seal member includes:
      a main body part projecting toward a vehicle inside of the laminated glass;
      a first fixing part bonded to the vehicle outside glass plate via the shielding layer; and
      a lip part projecting from the first fixing part in a direction opposite to the vehicle inside glass plate.

2. The window glass with a seal member according to claim 1,
   wherein the vehicle inside glass plate contacts an interior member of the vehicle on a vehicle inside surface of the vehicle inside glass plate, and
   wherein the end of the vehicle outside glass plate, an inner end of the first fixing part, the end of the vehicle inside glass plate, an inner end of the interior member, and an inner end of the shielding layer are sequentially arranged inward in the in-plane direction with respect to the outer peripheral edge.

3. The window glass with a seal member according to claim 2,
   wherein a bonding member is arranged on the shielding layer between the end of the vehicle inside glass plate and the seal member, and the laminated glass is bonded via the bonding member to a part of a body flange of the vehicle facing the vehicle inside surface of the vehicle inside glass plate of the laminated glass.

4. The window glass with a seal member according to claim 3,
   wherein a material of the bonding member is any one selected from the group consisting of an acrylic resin-based adhesive agent, a urethane resin-based adhesive agent, and an epoxy resin-based adhesive agent.

5. The window glass with a seal member according to claim 1,
   wherein the seal member further includes a second fixing part bonded to a peripheral portion of a vehicle inside surface of the vehicle inside glass plate.

6. The window glass with a seal member according to claim 5,
   wherein an area of a region where the second fixing part is bonded to the vehicle inside glass plate is smaller than an area of a region where the first fixing part is bonded to the vehicle outside glass plate on the shielding layer.

7. The window glass with a seal member according to claim 5,
   wherein the vehicle inside glass plate contacts an interior member of the vehicle on the vehicle inside surface of the vehicle inside glass plate, and
   wherein the end of the vehicle outside glass plate, the end of the vehicle inside glass plate, an inner end of the second fixing part, an inner end of the interior member, and an inner end of the shielding layer are sequentially arranged inward in the in-plane direction with respect to the outer peripheral edge.

8. The window glass with a seal member according to claim 5,
   wherein a bonding member is arranged on the vehicle inside surface of the vehicle inside glass plate, and the laminated glass is bonded via the bonding member to a part of a body flange of the vehicle facing the vehicle inside surface of the vehicle inside glass plate of the laminated glass.

9. The window glass with a seal member according to claim 5,
   wherein the seal member is arranged so that an inner end of the second fixing part is located inward in the in-plane direction from the end of the vehicle inside glass plate.

10. The window glass with a seal member according to claim 1,
    wherein the plate thickness of the vehicle outside glass plate is greater than or equal to 1.5 mm and less than or equal to 2.2 mm.

11. The window glass with a seal member according to claim 1,
    wherein the vehicle inside glass plate is chemically tempered.

12. The window glass with a seal member according to claim 1,
    wherein the plate thickness of the vehicle inside glass plate is greater than or equal to 0.2 mm and less than or equal to 1.0 mm.

13. The window glass with a seal member according to claim 1,
    wherein the shielding layer and the first fixing part are bonded to each other via a bonding layer.

14. The window glass with a seal member according to claim 1, wherein, when the window glass is mounted to a vehicle body, the lip part of the seal member contacts a body flange of the vehicle.

15. The window glass with a seal member according to claim 1, wherein the lip part is made of an elastic material.

16. The window glass with a seal member according to claim 1, wherein the main body part is separated by a small distance from a body flange of the vehicle.

* * * * *